US006124649A

United States Patent [19]

Schafroth

[11] Patent Number: 6,124,649

[45] Date of Patent: Sep. 26, 2000

[54] MICRO-GENERATOR MODULE AND CLOCKWORK MOVEMENT CONTAINING SUCH A MICRO-GENERATOR

[75] Inventor: Konrad Schafroth, Berne, Switzerland

[73] Assignee: Ronda AG, Lausen, Switzerland

[21] Appl. No.: 08/995,605

[22] Filed: Dec. 22, 1997

[30] Foreign Application Priority Data

Dec. 23, 1996 [CH] Switzerland ........................ 96810901

[51] Int. Cl.[7] ........................ H02K 21/00; G04C 15/00

[52] U.S. Cl. ........................ 310/40 MM; 310/268; 310/156; 310/180

[58] Field of Search ........................ 310/40 MM, 268, 310/254, 179, 180, 194, 184, 162, 156

[56] References Cited

U.S. PATENT DOCUMENTS 3,937,001 2/1976 Berney ........................ 318/147
4,008,566 2/1977 McClintock ........................ 58/50 R

FOREIGN PATENT DOCUMENTS

WO 84/01041 3/1984 Australia ........................ G04C 10/00
0 483 065 10/1991 European Pat. Off. ........ G04C 10/00
751445 1/1997 European Pat. Off. ........ G04C 10/00
18 11 389 U 9/1959 Germany .
2751797 11/1977 Germany ........................ G04C 3/00

*Primary Examiner*—Nestor Ramirez
*Assistant Examiner*—Burton S. Mullins
*Attorney, Agent, or Firm*—Pearne & Gordon LLP

[57] ABSTRACT

Micro-generator for a clockwork movement. It contains a rotor provided with two disks and a stator with three coils connected in series. Each disk is provided with six permanent magnets with alternating north-south polarity. The coils are mounted on a module containing an electronic circuit. This circuit controls the speed of the generator in that it compares the frequency of the signal at the output of the generator with a reference frequency derived from a quartz oscillator and changes the load of the generator by means of a variable brake resistance.

The micro-generator is constructed in such a way that the peak voltage of the generated signal is as high as possible and the space requirement inertia and frictional resistance of the rotor are kept as low as possible. To achieve this, the coils of the rotor are disposed on the module asymmetrically with respect to the axis of the rotor. The coils can have a maximal surface, the micro-generator being easily mountable.

9 Claims, 4 Drawing Sheets

MICRO-GENERATOR MODULE AND CLOCKWORK MOVEMENT CONTAINING SUCH A MICRO-GENERATOR

Figure 1:
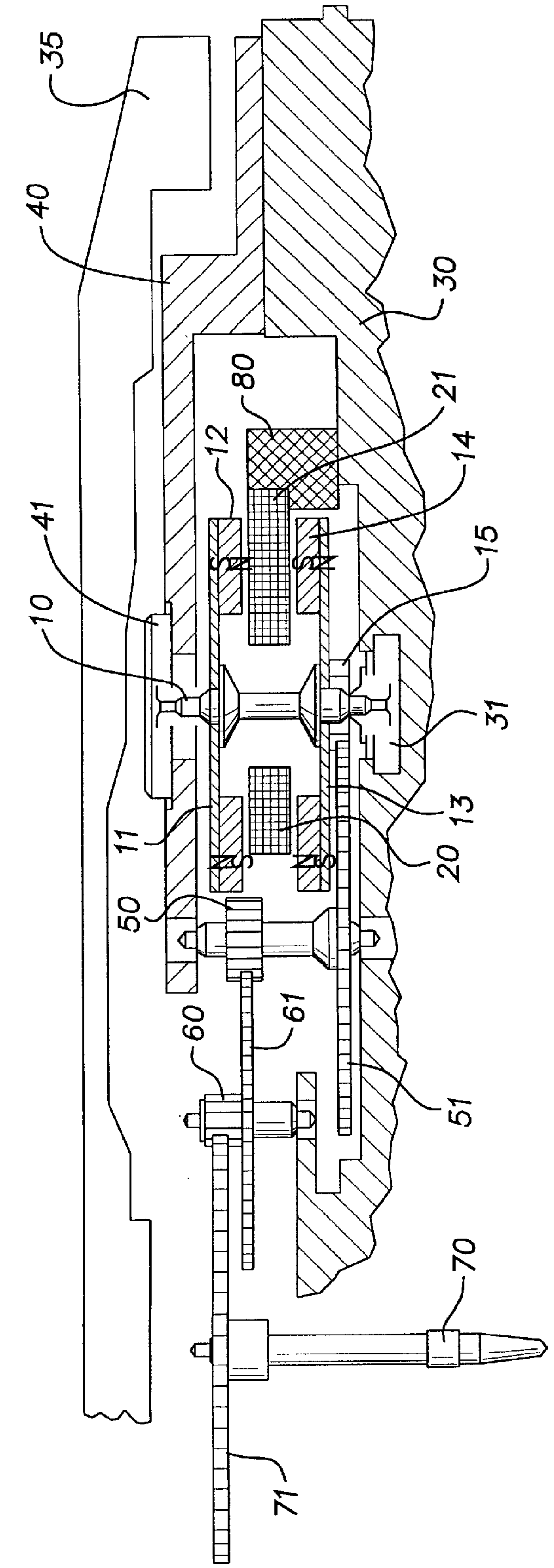

This invention relates to a micro-generator, in particular a micro-generator for a clockwork movement or for other miniaturized electronic or electro-mechanical devices. This invention likewise relates to an electronic module and a clockwork movement containing such a micro-generator.

Such micro-generators find application especially in portable miniaturized devices, for example in watches, hearing aids, photo apparatus, or in radio receivers. The Swiss patent CH 597 636 (Ebauches SA), for example, discloses a clockwork movement whose spring drives a time display, via a gear train, and a generator supplying a.c. voltage. The generator feeds a rectifier; the rectifier feeds a capacitive component, and the capacitive component feeds an electronic reference circuit with a stable quartz oscillator as well as an electronic control circuit. The electronic control circuit has a comparator-logic circuit and an energy dissipation circuit, connected to the output of the comparator-logic circuit and controllable in its power consumption through the comparator-logic circuit. One input of the comparator-logic circuit is connected with the electronic reference circuit, and another input of the comparator-logic circuit is connected with the generator. The comparator-logic circuit is designed in such a way that it compares a clock pulse signal coming from the electronic reference circuit with a clock pulse originating from the generator, and, depending upon the result of this comparison, controls the amount of the power consumption of the energy dissipation circuit, and in this way, by means of control of the control circuit power consumption, controls the angular velocity of the generator and thus the speed of the time display. Such a watch therefore combines the advantages of a mechanical watch with those of a quartz watch.

The micro-generator described in the Swiss patent CH 597 636 consists of a rotor, set in rotation by means of the spring via a gearing, and a stator formed by at least one fixed coil. The rotor is made up of two disks, of which one is provided with six permanent magnets, alternately polarized north-south. During rotation of the rotor, the magnets induce an alternating voltage in the coil.

The European patents EP 0 170 303 (Kinetron), EP 0 474 101 (Micromag) and in particular EP 0 547 083 (Kinetron) describe other types of micro-generators. Various designs of such generators are also known from the book *Dauermagnete, Werkstoffe & Anwendungen*, in particular chapter 9 "Elektrische Uhren mit Dauermagnete," by K. Schüler and K. Brinkmann, Springerverlag Berlin/New York/Heidelberg, 1970.

The object of the invention is to propose an improved micro-generator, in particular a micro-generator adapted to clockwork movements.

It is especially the object of this invention to propose a micro-generator whose driven mass is as small as possible in order to reduce frictional losses and the moment of inertia of the micro-generator. This way the micro-generator can be driven by means of a spring having minimal space requirements.

Another object is to reduce the space requirements of the micro-generator itself so that it can be accommodated easily in a miniaturized device, for example in a clockwork movement.

A further object is to propose a micro-generator of simple construction, which is easy to assemble and which is good value for money.

According to the invention these objects are attained through a micro-generator comprising a group of at least three electrically connected coils and a rotor, provided with an upper disk and a lower disk, whose disks are disposed on each side of said coils, the upper surface of the lower disk and the lower surface of the upper disk both being provided with a plurality of magnetic areas with alternating polarity, which, one after the other, are led past each of said coils during the rotation, said at least three coils being disposed asymmetrically about the axis of the rotor.

Figure 2:
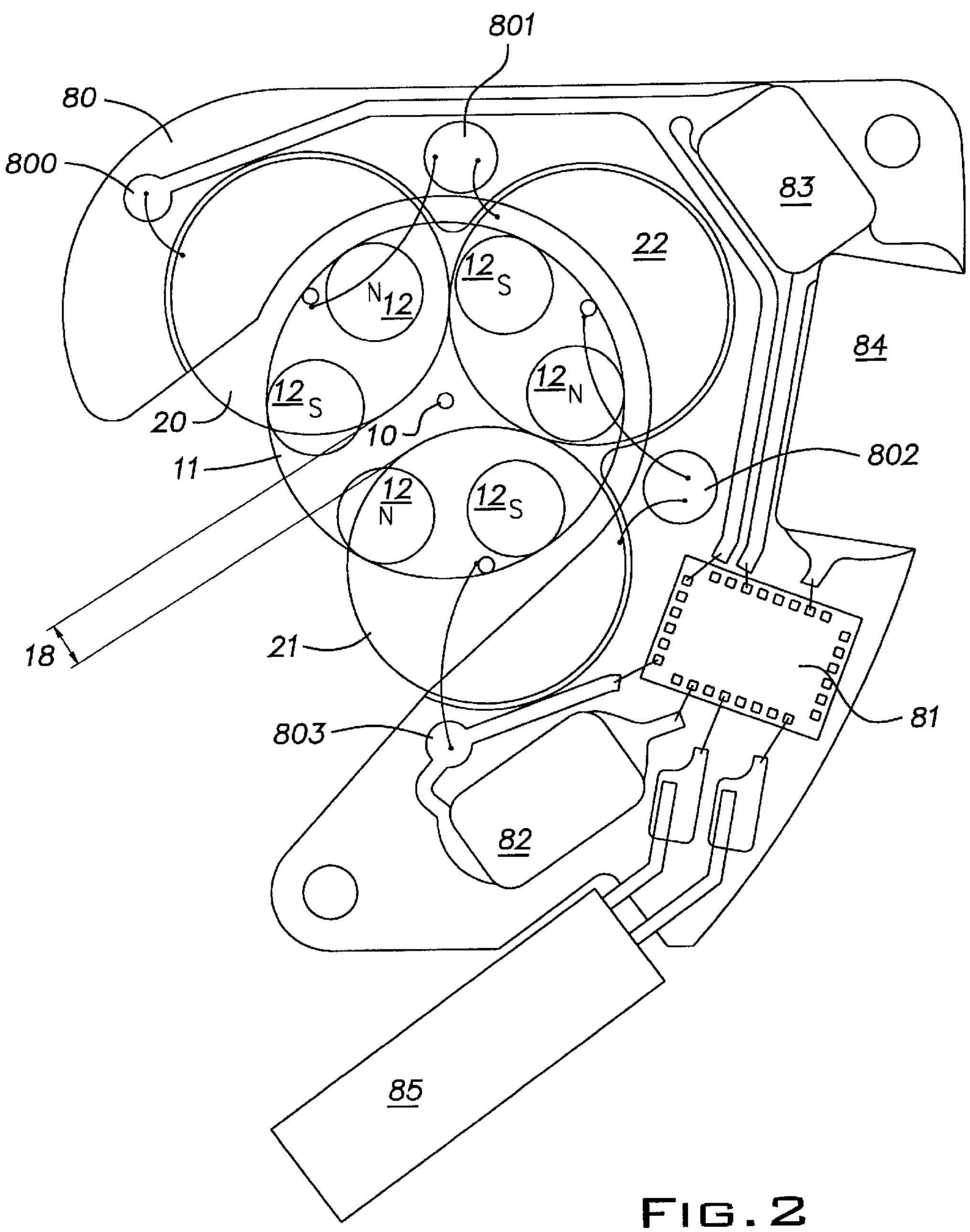
Figure 3:
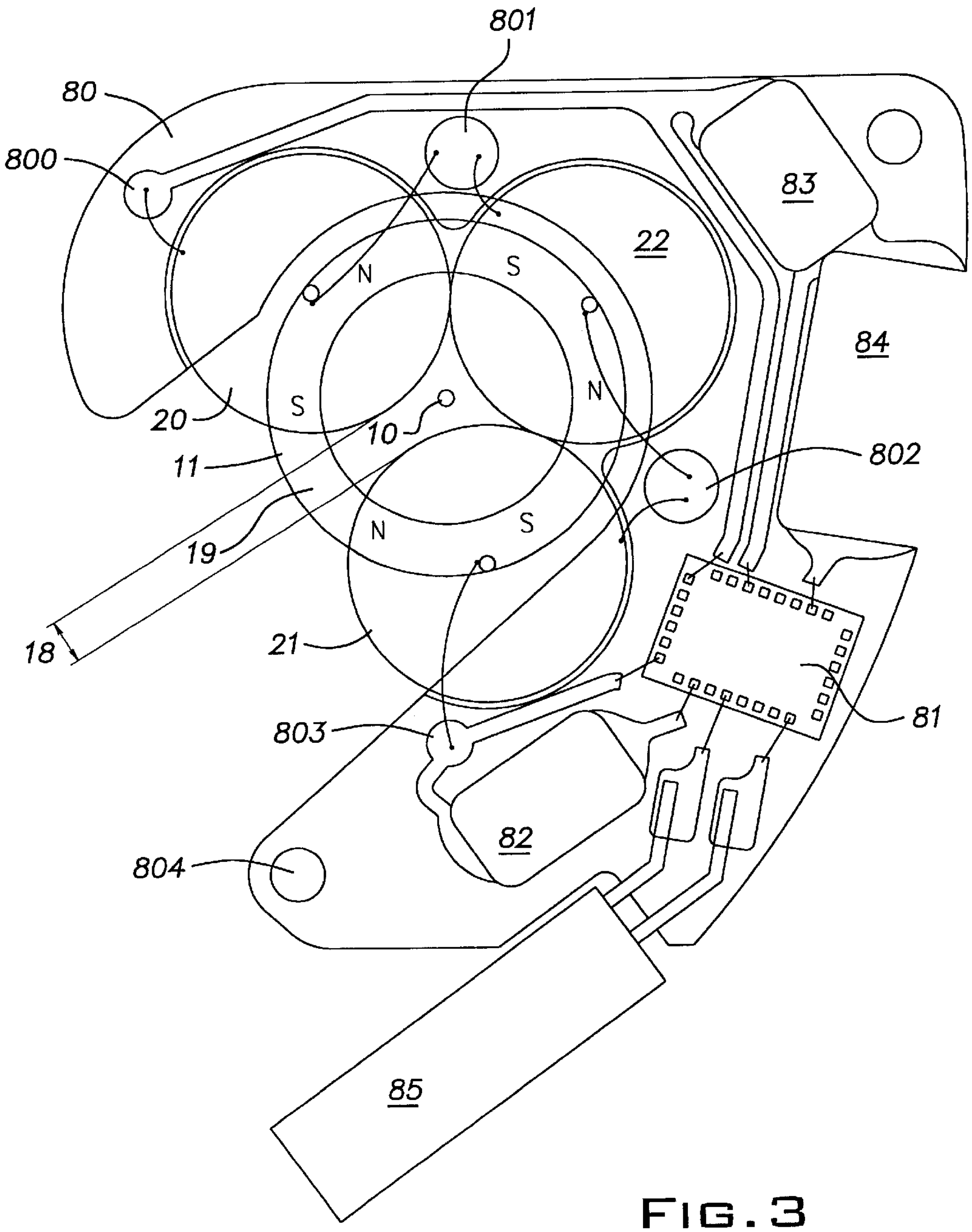
Figure 4:
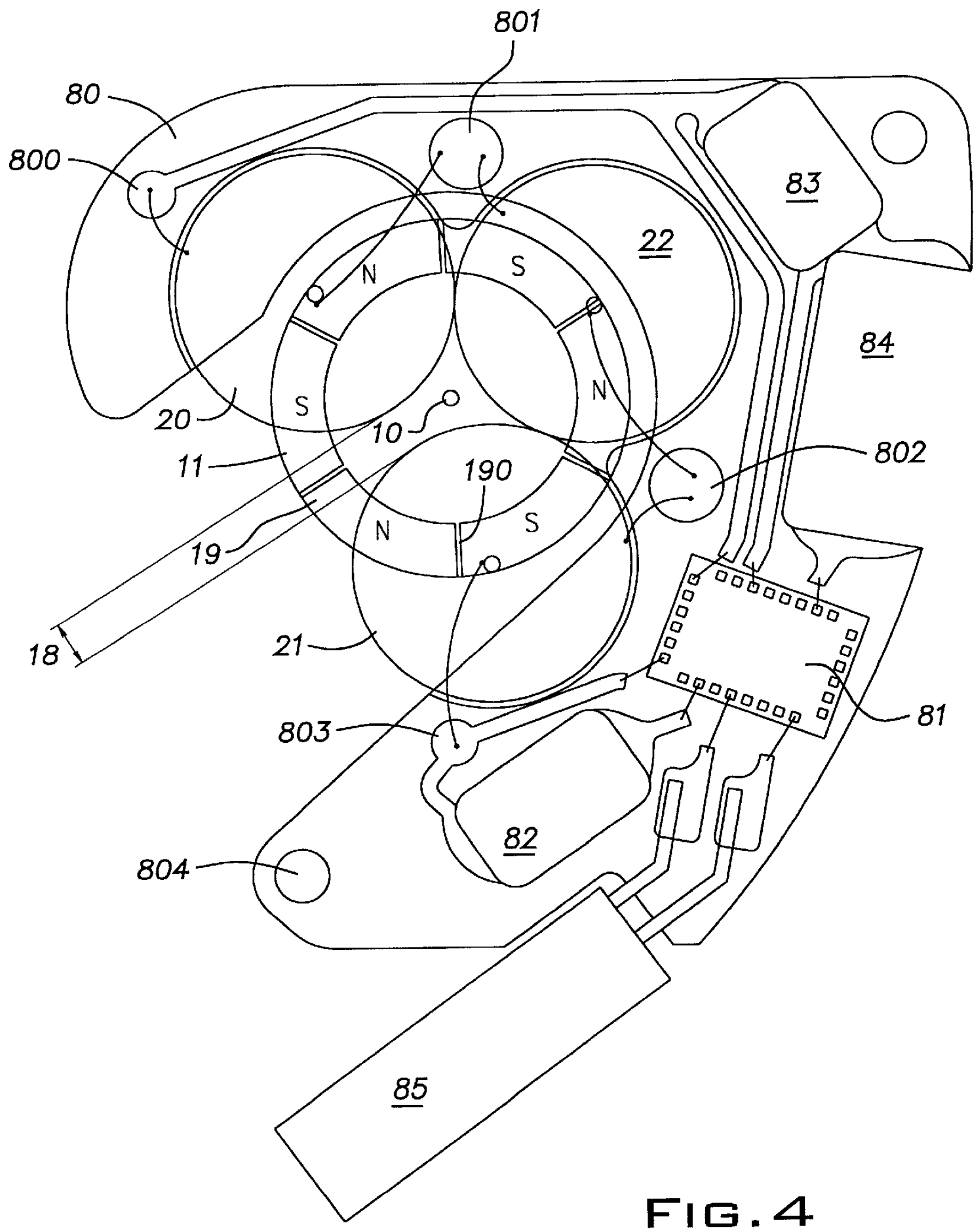

Example embodiments of the invention will be explained more closely in the following with reference to the drawings. Shown are:

FIG. 1, a cross-section through a part of the gearing and of the micro-generator of a clockwork movement according to the invention;

FIG. 2, a view from above of a module equipped with a first variant of the micro-generator and the associated electronics;

FIG. 3, a view from above of a module equipped with a second variant of the micro-generator and the associated electronics; and FIG. 4 a view from above of a module equipped with a third variant of the micro-generator and the associated electronics.

FIG. 1 is a lateral section of a micro-generator according to the invention mounted in a clockwork movement, only those elements necessary for understanding the invention being depicted. The clockwork movement contains a mechanical energy store in the form of a spring (not shown). The spring is wound by a winding device (not shown) or preferably by a weight brought into oscillation through the movements of the arm of the wearer of the watch. Via a conventional gearing (not shown) the spring drives the various hands and indicators of the watch, in particular the seconds-hand, which is mounted on the seconds-arbor 70.

The seconds-wheel 71 mounted on the seconds-arbor 70 drives a first intermediate pinion 60, which for its part drives a second intermediate pinion 50 via the first intermediate wheel 61. The first intermediate pinion 60 as well as its arbor are made of steel or of another suitable metal. In contrast, the second intermediate pinion 50 and its arbor are made of a non-magnetic material, preferably of a copper-beryllium alloy, so that no positional moment is exercised upon the generator owing to the power of the magnet on the intermediate wheel. Should magnetic materials be used for the second intermediate wheel, the positional moment on the generator would be several times higher than the drive moment at the disposal of the spring, which would make the starting of the generator impossible.

The second pinion 50, for its part, drives the shaft of the rotor of the generator via the second intermediate wheel 51 and the pinion 15. The shaft 10 is kept rotating between two synthetic shock-absorbing bearings 31 and 41. The first shock-absorbing bearing 31 is connected with the plate 30 of the clockwork, whereas the second shock-absorbing bearing 41 is connected with a bar 40, as described further below.

The rotor consists of an upper disk 11 and a lower disk 13, which are firmly connected to the shaft 10. To reduce the inertia of the rotor, the disks 11 and 13 are preferably made of a sheet metal with high saturation (remanence about 2.4 tesla), which makes it possible to use a very thin sheet metal. The lower surface of the upper disk 11 in this example has six individual magnets 12, which are disposed at regular intervals near the periphery of the disk. The magnets 12 have preferably a cylindrical shape and are glued on the disk 11. Their remanence is in the vicinity of one tesla, and they are disposed with north-south-north alternating polarity. The upper surface of the lower disk is likewise provided with six individual magnets 14, which are disposed symmetrically with respect to the six magnets of the upper disk.

Good results have been obtained with test generators having the following dimensions: The diameter of the rotor measured approximately 5 millimeters; the magnets had a diameter of 1.45 millimeters and a mutual spacing of about 0.9 millimeter. The second intermediate wheel 50 is placed in this example at least 0.5 millimeter from the edge of the rotor. The selection of a shaft of copper-beryllium moreover permits magnetism of the wheel 50, and thus the positional moment can be reduced to a strict minimum.

The stator has three induction coils 20, 21, 22, which are mounted between the disks 11 and 13. The coils are connected with each other in series and are fixed on a module, which at the same time serves as the printed circuit board support for an electronic circuit. The generator is mounted between the plate 30 of the clockwork movement and a bar 40, which allows the entire generator including the coils to be concealed. This construction has the following significant advantages: If the bar 40 is made of a material which conducts electricity, it forms together with the metallic plate 30 an electromagnetic shielding around the micro-generator, which protects the latter from external electromagnet interference. Owing to the fact that all electronic components including the coils 20, 21, 22 are concealed under the bar, these components remain invisible even in a watch provided with a transparent back cover, which many people find aesthetic.

FIG. 2 shows a view from above of the module 80 equipped with a micro-generator according to a first variant of the invention. The module 80 comprises a support of synthetic or composite material. The three coils 20, 21, 22 of the stator of the micro-generator are mounted on the module 80, and are fixed, for example by gluing. In a preferred embodiment, the module 80 is made of a material permeable to ultraviolet light, and the coils are glued on the module by means of an adhesive which dries by means of ultraviolet light, which permits a very quick drying and a durable connection. In this case the thickness of the module is sufficiently fine to let ultraviolet light through, but nevertheless thick enough so that recesses can be milled for the coils 20, 21, 22 and for the capacitors. The preferred thickness of the module is approximately one millimeter. Other kinds of adhesive can also be used, however, for example a two-component glue or a resin which dries in the air or by light-sensitive means.

In the trials undertaken, the diameter of the coil was 4 millimeters. The diameter of the wire used for the winding was 16 microns; attempts were made to wind a wire of 12 microns. One end each of the coil 20 and of the coil 22 are soldered to the synthetic module 80 at a point of connection 801, or preferably directly bonded. The other end of the coil 22 is soldered or bonded with an end of the coil 21 at a point of connection 802 on the module 80. The other end of the coil 20 or 21, respectively, is soldered or bonded at a contact point 800 or 803, respectively. The three coils 20, 21, 22 of the stator are thus serially connected between the points 800 and 803 of the electronic module 80. By means of this series connection, the voltages produced by the individual coils are added. The conducting paths on the printed circuit are made in a way known in printed circuit technology.

An integrated circuit (IC) 81 is mounted on the module 80. The purpose of this IC is to monitor the rotational speed of the micro-generator and to adjust this speed by changing the value of a variable load resistor with which the micro-generator is loaded. The functions of this circuit are not described in detail here since at least an example embodiment thereof has already been described in the patent application PCT/EP96/02791, filed on Jun. 26, 1996, in the name of Schafroth, the contents of which application is incorporated here by reference. This circuit has a voltage tripler, which triples the voltage generated by the micro-generator. This voltage tripler functions preferably without diode voltage drops. It uses three capacitors 82, 83, 84, which are mounted on the module 80 outside the integrated circuit. A counter, integrated in the IC, is increased by one increment at each period of the signal provided by the micro-generator, and is reduced by one increment at each flank of a signal obtained by dividing the frequency from an external quartz 85. When the rotor of the micro-generator turns too fast, the frequency of the signal at the output of the micro-generator (between the points 800 and 803) is higher than the frequency of the divided signal coming from the quartz 85. Thus the counter will consequently be increased by one increment more often than it is reduced by one increment, and its value will quickly increase. An integrated braking control circuit controls the value of a load resistor of the micro-generator as a function of the value of the counter. In the case of increase in the value of the counter, the value of the load resistor is reduced, and the micro-generator is thus braked. The rotational speed of the rotor and the arrangement of the magnets are preferably selected in such a way that the alternating voltage generated by the micro-generator has a frequency of 2 n Hz with n being any integer.

The electronics inside the IC 81 are fed by means of the voltage at the output of the generator. As indicated, this voltage is multiplied times three with the aid of the three capacitors. In practice it is difficult to design suitable circuits, which multiply the voltage more than times three. If the IC 81 is designed in CMOS technology with very minimal consumption, a signal with a peak voltage of at least 0.4 volt must be applied to the input of the voltage tripler. The micro-generator must therefore be designed in such a way that it supplies at least this peak voltage. A higher peak voltage can be obtained easily by increasing the dimension of the disks 11, 13 of the rotor and of the magnets 12. This solution is disadvantageous, however, in a miniaturized device such as a watch. Moreover, more friction would result, and in particular a higher inertia of the rotor, whereby consequently a greater driving power would be required for the generator and therefore the drive spring would be bigger.

According to the invention, the peak voltage is maximized, and the space requirement, the inertia of the rotor and the frictional resistance minimized by decreasing the diameter and the thickness of the rotor in order to reduce its inertia. In addition, the amount of interim space between the permanent magnets 12 on the rotor and the coils 20, 21, 22 is likewise reduced in order to maximize the gradient of the magnetic field B between the magnets and the coils, leading to a greater induced voltage. The trials were made with an air gap of about 0.1 millimeter.

The peak voltage is moreover maximized in that the surfaces of the coils 20, 21, 22 are increased as much as possible in order to collect the greatest possible share of the magnetic flux generated by the magnets. It is however desirable to be able to mount the rotor after the coils 20, 21, 22 have been glued on the module 80. For this purpose, a space 18 is provided between the two coils 20, 21 having a width at least equal to the diameter of the central portion of the shaft 10 of the rotor.

Simulations and trials have shown that the induced peak voltage is maximal with the special arrangement of the coils 20, 21, 22 shown by way of example in FIG. 2. In this arrangement the coils 20, 21, and 22 are disposed in an asymmetrical way with respect to the shaft of the rotor 10. The centers of the coils 20, 21, 22 consequently assume angular positions irregularly distributed about the shaft of the rotor 10; in this example the absolute angular spacing between the coils 20 and 21 is greater than the angular spacing between the coils 20 and 22 or between the coils 21 and 22. The coils 20, 21 and 22 are all in touch with at least one other coil; coil 22 is even in touch with two other coils. The insulation between the coils is ensured solely through the insulation around the wires of the coils. A space 18, through which the shaft of the rotor 10 can be led, is disposed between the coils 20 and 21.

The clockwork movement preferably contains a non-magnetic spring (not shown), which stops the rotor when the time is being set. The spring is preferably connected to the winding crown (not shown) in such a way that pulling the crown causes the spring to press directly or indirectly upon the rotor, thus stopping the rotation of the rotor. When the crown is pushed back, the spring is released from the rotor and exercises at the same time a rotational impulse upon the rotor so that start-up of the rotor is ensured. Such braking and acceleration means are known in conventional mechanical clockwork movements in connection with stopping the seconds-hand, and do not need to be described in further detail here.

When the winding crown is pulled, the rotor 10 is stopped, and thus no more energy is fed to the capacitors 82, 83, 84. The capacitors are then slowly unloaded so that the IC 81 soon cannot function anymore.

When the crown is pushed back, the rotor 10 starts running again, and the capacitors 82, 83, 84 are again loaded by the generator. As soon as the voltage at the capacitors is greater than the minimal running voltage of the IC, the IC begins to function again. During this series of events, the counter, already mentioned, on the IC is started with a pre-defined value so that the start-up series of events can be compensated for, and the seconds-hand is at the same place exactly 60 seconds after the winding crown has been pushed back.

In this way it is possible to set the time precisely within a fraction of a second.

The device is put together as follows. First the various arbors and wheels 50, 60, 70, etc. are disposed in the clockwork, then the rotor is mounted between the plate 30 and the bar 40. The module 80, on which the coils 20, 21, 22 have been glued beforehand, is then placed between the disks 11, 13 of the rotor and fastened on the plate 30, preferably by non-magnetic screw means.

In a second assembly variant, the shaft 10 of the rotor is pushed beforehand through the space 18 between the coils 20, 21, 22 of the dismantled module 80, then the module-rotor unit is inserted into the clockwork. The module 80 is then fastened, preferably by means of non-magnetic screws, to the plate 30, then the upper bar 40 is installed and is screwed on the plate 30 in order to hold the upper part of the shaft of the rotor.

FIG. 3 illustrates, in the same view as FIG. 2, a variant of the invention in which the individual magnets 12 are replaced by a continuous ring 19. The angularly successive segments of the ring 19 are permanently magnetized with alternating polarity. The ring 19 preferably contains three sections magnetized with a positive polarity alternating with three sections of opposite polarity. This variant makes possible increase of the peak voltage of the signal generated at the output of the coils 20, 21, 22. If the diameter of the rotor is 5.3 millimeters, as in the example further above, the ring preferably has an equal outer diameter and an inner diameter of 3.5 millimeters.

Furthermore in this variant the surface of the module 80 is enlarged in the direction of the second intermediate arbor 50, which brings with it more freedom in the arrangement of the conducting paths and components. A hole 804 is provided in the module 80 for introduction of the intermediate arbor 50. This extended module can therefore only be assembled according to the second described assembly variant, which means the rotor is led beforehand into the dismantled module 80, then the module with the rotor are introduced thereupon into the clockwork by leading the intermediate arbor 50 through the hole 804, before the bar 40 is fastened on the plate 30. It goes without saying that this form of the module 80 can also be used with the rotor described in the example according to FIG. 2.

FIG. 4 illustrates, in the same view as FIGS. 2 and 3, a variant of the invention in which the individual magnets 12 are replaced by an interrupted ring 19. In this variant the ring is formed by a plurality of ring segments having the same surface, which are separated from one another by interim spaces or by magnetically neutral sections 190. The width of the interim spaces or sections 190 is preferably minimal when compared to the diameter of the ring; for example, tests have been made with a width of 0.3 millimeters.

One skilled in the art will understand that the invention also applies to micro-generators which are provided with a rotor which has more than two super-imposed disks, for example micro-generators having three disks which are all provided with permanent magnets, three coils being disposed between each pair of disks. In general, the invention encompasses generators with N disks and (N−1) sets, lying one on top of the other, of three coils in each case.

What is claimed is:

1. A micro-generator for a clockwork movement and for similar devices, comprising a group of at least three electrically connected coils and a rotor, provided with an upper disk and a lower disk, whose disks are disposed on each side of said coils, the upper surface of the lower disk and the lower surface of the upper disk both being provided with a plurality of magnetic areas with alternating polarity, which, one after the other, are lead past each of said coils during the rotation, said at least three coils being disposed asymmetrically about the axis of the rotor wherein each coil touches at least one other coil.

2. The micro-generator according to claim 1, wherein the angular spacing between the centers of said coils is irregular in relation to the axis of the rotor.

3. Micro-generator according to claim 1, wherein it contains exactly three coils.

4. Micro-generator according to claim 1, wherein each of said disks of the rotor has an even number of individual magnets with alternating polarity.

5. Micro-generator according to the preceding claim, wherein said number of individual magnets on each disk is equal to two times the number of coils.

6. Micro-generator according to claim 1, wherein each of said disks of the rotor is provided with a magnet ring which comprises permanently magnetized angular segments with alternating polarity.

7. Micro-generator according to the preceding claim, wherein said ring contains interruptions between each magnetized angular segment with alternating polarity.

8. Micro-generator according to claim 1, wherein it is mounted between a plate and a rotor bar of the clockwork and the rotor bar and the plate are designed in such a way that the generator is electromagnetically shielded.

9. Micro-generator according to claim 1, wherein it is driven by means of a set of toothed wheels and pinions, and at least the toothed wheel situated closest to the micro-generator and its arbor is made of non-magnetic material.

* * * * *

UNITED STATES PATENT AND TRADEMARK OFFICE

CERTIFICATE OF CORRECTION

PATENT NO. : 6,124,649

DATED : September 26, 2000

INVENTOR(S) :. Schafroth

It is certified that error appears in the above-identified patent and that said Letters Patent is hereby corrected as shown below:

On the Title page, item [73] Assignee should read --Ronda AG. Lausen, Switzerland; Conseils et Manufactures VLG SA, Neuchatel Switzerland --.

Signed and Sealed this

Thirteenth Day of March, 2001

Nicholas P. Godici

Attest:

NICHOLAS P. GODICI

*Attesting Officer* *Acting Director of the United States Patent and Trademark Office*

UNITED STATES PATENT AND TRADEMARK OFFICE

CERTIFICATE OF CORRECTION

PATENT NO. : 6,124,649
DATED : September 26, 2000
INVENTOR(S) : Schafroth

It is certified that error appears in the above-identified patent and that said Letters Patent is hereby corrected as shown below:

Title page,
Item [73], Assignee should read -- Conseils et Manufactures VLG SA, Neuchatel Switzerland --.

This certificate supersedes Certificate of Correction issued March 13, 2001.

Signed and Sealed this

Twentieth Day of August, 2002

*Attest:*

JAMES E. ROGAN

*Attesting Officer*

*Director of the United States Patent and Trademark Office*